United States Patent
Cornelis et al.

(10) Patent No.: US 12,535,250 B2
(45) Date of Patent: Jan. 27, 2026

(54) HEAT PUMP SYSTEM AND CONTROLLER FOR CONTROLLING OPERATION OF THE SAME

(71) Applicants: DAIKIN INDUSTRIES, LTD., Osaka (JP); DAIKIN EUROPE N.V., Ostend (BE)

(72) Inventors: Kevin Cornelis, Ostend (BE); Satoshi Kawano, Osaka (JP)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 382 days.

(21) Appl. No.: 17/918,418

(22) PCT Filed: May 13, 2021

(86) PCT No.: PCT/JP2021/018153
§ 371 (c)(1),
(2) Date: Oct. 12, 2022

(87) PCT Pub. No.: WO2021/235303
PCT Pub. Date: Nov. 25, 2021

(65) Prior Publication Data
US 2023/0145115 A1    May 11, 2023

(30) Foreign Application Priority Data
May 20, 2020   (EP) ..................................... 20175770

(51) Int. Cl.
*F25B 25/02* (2006.01)
*F25B 30/02* (2006.01)
(Continued)

(52) U.S. Cl.
CPC .............. *F25B 41/39* (2021.01); *F25B 30/02* (2013.01); *F25B 41/20* (2021.01); *F25B 2500/222* (2013.01); *F25B 2600/2519* (2013.01)

(58) Field of Classification Search
CPC .......... F25B 41/39; F25B 41/20; F25B 30/02; F25B 2500/222; F25B 2600/2519
See application file for complete search history.

(56) References Cited

U.S. PATENT DOCUMENTS

2012/0272672 A1    11/2012   Morimoto et al.

FOREIGN PATENT DOCUMENTS

| EP | 3 115 714 A1 | 1/2017 |
| EP | 3 543 624 A1 | 9/2019 |

(Continued)

OTHER PUBLICATIONS

Yuta, Refrigeration cycle device, 2017, Full Document (Year: 2017).*

(Continued)

*Primary Examiner* — Nael N Babaa
(74) *Attorney, Agent, or Firm* — Birch, Stewart, Kolasch & Birch, LLP

(57) ABSTRACT

Provided is a heat pump system having a compressor, a liquid-side on-off valve, a gas-side on-off valve, and a controller. The controller is configured to perform a refrigerant recovery operation for recovering refrigerant from a utilization-side piping section to a heatsource-side piping section by operating the compressor while the liquid-side on-off valve is closed and the gas-side on-off valve is open, and control the system such that the gas-side on-off valve starts closing when a predetermined valve-close condition is satisfied during the compressor is operating for recovering refrigerant, and such that the operation of the compressor for (Continued)

recovering refrigerant stops after the closing of the gas-side on-off valve started.

20 Claims, 7 Drawing Sheets

(51) Int. Cl.
  *F25B 41/20* (2021.01)
  *F25B 41/39* (2021.01)

(56) References Cited

FOREIGN PATENT DOCUMENTS

| GB | 2565463 A | 2/2019 | |
|---|---|---|---|
| JP | 2015-75272 A | 4/2015 | |
| JP | 2016-90223 A | 5/2016 | |
| WO | WO 2011/099063 A1 | 8/2011 | |
| WO | WO-2017191814 A1 * | 11/2017 | ................ F25B 1/00 |

OTHER PUBLICATIONS

International Preliminary Report on Patentability and Written Opinion of the International Searching Authority for International Application No. PCT/JP2021/018153, dated Dec. 1, 2022.
Extended European Search Report, issued in Priority Application No. 20175770.5, dated Nov. 9, 2020.
International Search Report, issued in PCT/JP2021/018153, dated Aug. 13, 2021.
Written Opinion of the International Searching Authority, issued in PCT/JP2021/018153, dated Aug. 13, 2021.

* cited by examiner

[Fig. 2]
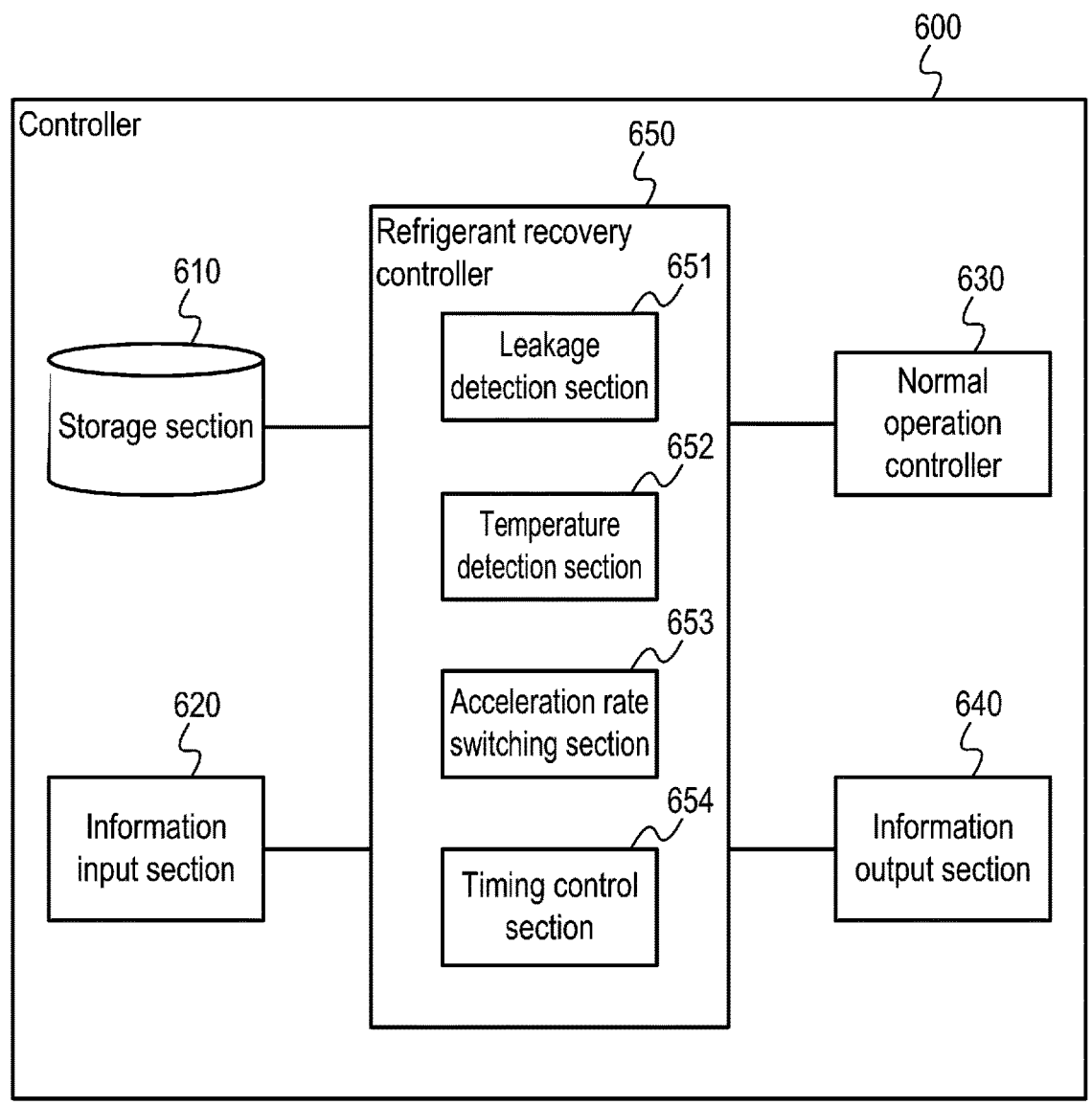

[Fig. 3]
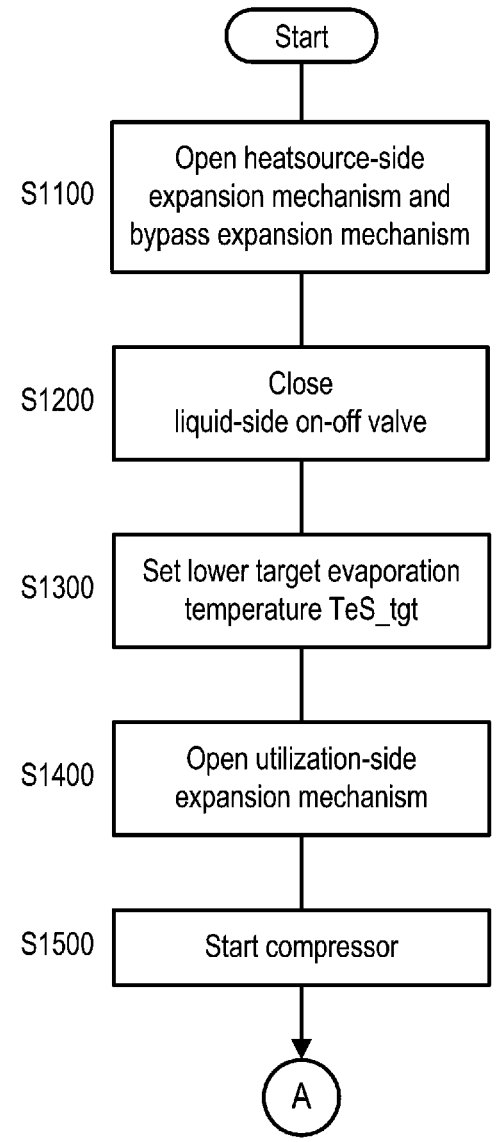

[Fig. 4]
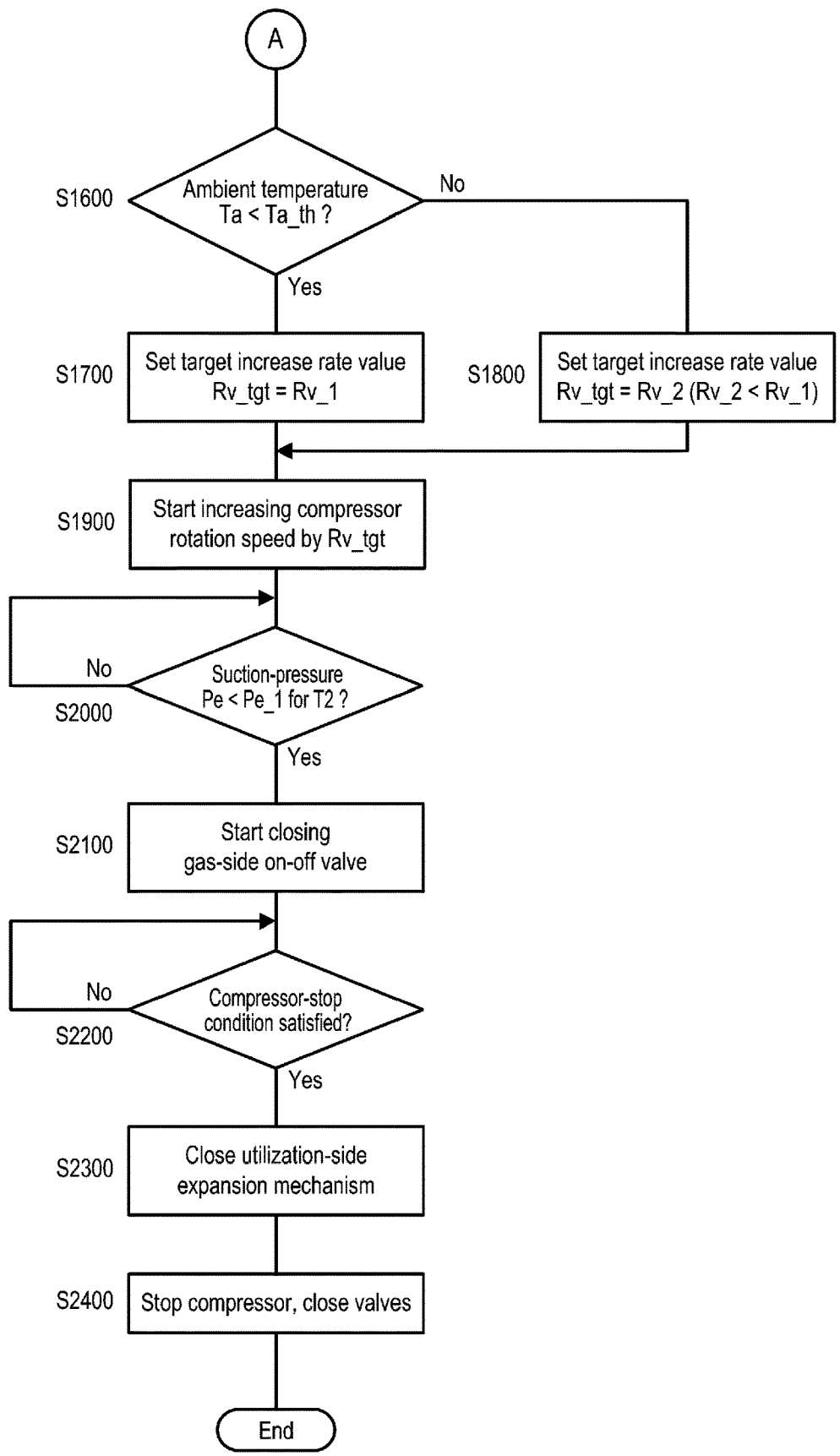

[Fig. 5]

| | Compressor-stop condition (S2200) |
|---|---|
| First condition | Discharge-pressure change rate IRpcI < Rpc_th<br>and<br>Suction-pressure change rate IRpeI < Rpe_th |
| Second condition | Discharge-pressure Pe < Pe_2 |
| Third condition | T_3 elapsed after completion of closing gas-side on-off valve |
| Fourth condition | T_4 elapsed after start of closing gas-side on-off valve |

HEAT PUMP SYSTEM AND CONTROLLER FOR CONTROLLING OPERATION OF THE SAME

TECHNICAL FIELD

The present invention relates to a heat pump system and a controller for controlling operation of a heat pump system.

BACKGROUND ART

EP 3 115 714 A1 proposes a heat pump system configured to perform a refrigerant recovery operation. In the refrigerant recovery operation, refrigerant is recovered from a utilization-side piping section to a heatsource-side piping section by operating a compressor while an on-off valve disposed in a liquid refrigerant pipe is closed and an on-off valve disposed in a gas refrigerant pipe is open. In the above system, the on-off valve disposed in the gas refrigerant pipe is closed after the refrigerant recovery operation.

However, with the above configuration, the refrigerant in the heatsource-side piping section would flow back to the utilization-side piping section through the gas refrigerant pipe before the on-off valve is closed.

CITATION LIST

Patent Literature

[PTL 1] EP 3 115 714 A1

SUMMARY OF INVENTION

The object of the present invention is to provide a heat pump system and a controller for controlling operation of a heat pump system that can prevent refrigerant which has been recovered to a heatsource-side piping section by a refrigerant recovery operation from flowing back to a utilization-side piping section.

A first aspect of the present invention provides a heat pump system, comprising: a compressor; a heatsource-side heat exchanger configured to cause heat exchange between refrigerant flowing therein and fluid passing therethrough; a utilization-side heat exchanger configured to cause heat exchange between refrigerant flowing therein and fluid passing therethrough; a high-pressure refrigerant pipe connected to each of a discharge port of the compressor and the heatsource-side heat exchanger; a liquid refrigerant pipe connected to each of the heatsource-side heat exchanger and the utilization-side heat exchanger; a low-pressure refrigerant pipe connected to each of the utilization-side heat exchanger and a suction port of the compressor; a liquid-side on-off valve disposed in the liquid refrigerant pipe; an expansion mechanism disposed in the liquid refrigerant pipe; a gas-side on-off valve disposed in the low-pressure refrigerant pipe; and a controller configured to control the heat pump system to perform a refrigerant recovery operation for recovering refrigerant from a utilization-side piping section to a heatsource-side piping section by operating the compressor while the liquid-side on-off valve is closed and the gas-side on-off valve is open, the utilization-side piping section extending between the liquid-side on-off valve and the gas-side on-off valve and including at least the utilization-side heat exchanger, the heatsource-side piping section extending between the gas-side on-off valve and the liquid-side on-off valve and including at least the compressor, wherein the controller is configured to, in the refrigerant recovery operation, control the heat pump system such that the gas-side on-off valve starts closing when a predetermined valve-close condition is satisfied during the compressor is operating for recovering refrigerant, and such that the operation of the compressor for recovering refrigerant stops after the closing of the gas-side on-off valve started.

As soon as the operation of the compressor for recovering refrigerant stops, pressure at the suction port of the compressor starts increasing, and this pressure increase propagates in the low-pressure refrigerant pipe. Thus, if the operation of the compressor for recovering refrigerant stops when the gas-side on-off valve is still fully open, the refrigerant easily flows back to the utilization-side piping section through the low-pressure refrigerant pipe. In this regard, the heat pump system with the above configuration stops the operation of the compressor after the closing of the gas-side on-off valve started. Hence, it is possible to prevent refrigerant recovered by the refrigerant recovery operation from flowing back to the utilization-side piping section.

According to a preferred embodiment of the heat pump system mentioned above, the heat pump system further comprises a refrigerant leakage detector configured to detect an occurrence of refrigerant leakage in the utilization-side piping section, wherein the controller is configured to control the heat pump system to perform the refrigerant recovery operation when the occurrence of refrigerant leakage has been detected.

With the above configuration, it is possible to evacuate refrigerant from the utilization-side piping section when a refrigerant leakage has occurred in utilization-side piping section. Thereby, further refrigerant leakage can be prevented, and repair of the leakage point can be safely performed.

According to another preferred embodiment of the heat pump system mentioned above, the gas-side on-off valve is an electric valve.

An electric valve is configured to rotate a motor to move a needle inside the valve and close a passage. Thus, although it is easy to control the start timing and speed of the closing of an electric valve, it takes relatively long to complete its closure. In this regard, the heat pump system according to the present invention can start closing the gas-side on-off valve earlier. Hence, the refrigerant back flow through the gas-side on-off valve can be effectively prevented.

According to further another preferred embodiment of any one of the heat pump systems mentioned above, at least the utilization-side heat exchanger is disposed in a utilization-side unit; and at least the compressor, the gas-side on-off valve, and the controller are disposed in a heatsource-side unit which is separated from the utilization-side unit.

The heat pump system in which elements are separated into a utilization-side unit and a heatsource-side unit is advantageous for various situations such as an air-conditioning system for multiple target spaces. With the above configuration, the compressor, the gas-side on-off valve, and the controller are disposed in the same unit. Thus, even if the heat pump system is separated into a utilization-side unit and a heatsource-side unit, the controller can control the gas-side on-off valve and the compressor from a close location. Thereby, it is possible to prevent the refrigerant recovered in the heatsource-side unit from flowing back to the utilization-side unit certainly.

According to further another preferred embodiment of any one of the heat pump systems mentioned above, Cv value of the gas-side on-off valve is greater than Cv value of liquid-side on-off valve.

In general, the diameter of the low-pressure refrigerant pipe is greater than that of the liquid refrigerant pipe, and Cv value of the gas-side on-off valve is thus greater than Cv value of liquid-side on-off valve. Meanwhile, the greater Cv value of a valve is, the longer it takes to complete closure of the valve. In this regard, the heat pump system according to the present invention can start closing the gas-side on-off valve earlier. Hence, the refrigerant back flow through the gas-side on-off valve can be effectively prevented.

According to further another preferred embodiment of any one of the heat pump systems mentioned above, a bypass pipe connected to the liquid refrigerant pipe at a point between the heatsource-side heat exchanger and the liquid-side on-off valve and connected to the low-pressure refrigerant pipe at a point between the gas-side on-off valve and the compressor; a bypass expansion mechanism disposed in the bypass pipe; and an accumulator interposed in the low-pressure refrigerant pipe at a point between the bypass pipe and the compressor, wherein the controller is configured to control, in the refrigerant recovery operation, the bypass expansion mechanism to open.

With the above configuration, it is possible to draw refrigerant from the utilization-side piping section to the heatsource-side piping section while circulating the drawn refrigerant within the heatsource-side piping section. Moreover, the refrigerant can be accumulated not only in the heatsource-side heat exchanger but also in the accumulator. Thus, it is possible to increase an amount of refrigerant to be recovered. Furthermore, volume of the heat source side heat exchanger can also be determined from its required heat exchange capacity, regardless of the amount of refrigerant to be recovered. Thus, size and design of the heat source side heat exchanger can be optimized.

According to further another preferred embodiment of any one of the heat pump systems mentioned above, the controller is configured to, in the refrigerant recovery operation, control the heat pump system such that the operation of the compressor for recovering refrigerant stops after the closing of the gas-side on-off valve is completed.

With the above configuration, even if the movement of the compressor quickly stops and the low-pressure refrigerant pipe of the heatsource-side piping section is short, it is possible to prevent the refrigerant back flow.

According to further another preferred embodiment of any one of the heat pump systems mentioned above, the heat pump system further comprises a suction pressure detector configured to detect pressure of refrigerant flowing in the low-pressure pipe, wherein the predetermined valve-close condition includes that the pressure of refrigerant flowing in the low-pressure pipe is below a first predetermined suction pressure value.

With the above configuration, it is possible to close off the flow of refrigerant in the low-pressure refrigerant pipe when the pressure in the low-pressure refrigerant pipe has become low, i.e. when it is supposed that refrigerant has been mostly recovered from the utilization-side piping section to the heatsource-side piping section. Thereby, it is possible to close the gas-side on-off valve earlier and thus stop the operation of the compressor earlier, while recovering most refrigerant.

According to further another preferred embodiment of any one of the heat pump systems mentioned above that has the low-pressure gas state detector, the predetermined valve-close condition further includes that the pressure of refrigerant flowing in the low-pressure pipe has been kept below the first predetermined suction pressure value for a second predetermined time.

With the above configuration, it is possible to close off the flow of refrigerant in the low-pressure refrigerant pipe on condition that the low pressure in the low-pressure refrigerant pipe has become sufficiently low, i.e. when refrigerant has been sufficiently recovered from the utilization-side piping section to the heatsource-side piping section. Thereby, it is possible to close the gas-side on-off valve earlier and thus stop the operation of the compressor earlier, while sufficiently recovering refrigerant.

According to further another preferred embodiment of any one of the heat pump systems mentioned above, the controller is configured to, in the refrigerant recovery operation, control the refrigerant compressor such that operation of the refrigerant compressor stops when a predetermined compressor-stop condition is satisfied after the gas-side on-off valve has started closing, the predetermined compressor-stop condition including at least one of: a first condition that change rate of pressure of refrigerant flowing in the high-pressure refrigerant pipe is below a first predetermined change rate value and change rate of pressure of refrigerant flowing in the low-pressure refrigerant pipe is below a second predetermined change rate value which is equal to or different from the first predetermined change rate value; a second condition that pressure of refrigerant flowing in the low-pressure refrigerant pipe is below a second predetermined suction pressure value which is lower than the first predetermined suction pressure value; a third condition that a third predetermined time has elapsed after the closing of the gas-side on-off valve was completed; and a fourth condition that a fourth predetermined time has elapsed after the closing of the gas-side on-off valve started.

With the above configuration, it is possible to stop the operation of the compressor to complete the refrigerant recovery operation at an appropriate timing. For instance, it is possible to stop the operation of the compressor when the heat pump system is in a state where refrigerant can be prevented from flowing back from the heatsource-side piping section to the utilization-side piping section via the low-pressure refrigerant pipe. As mentioned above, the gas-side on-off valve is started closing before the operation of the compressor is stopped regardless of the timing of the compressor stop.

A second aspect of the present invention provides a controller for controlling operation of a heat pump system, the heat pump system comprising: a compressor; a heatsource-side heat exchanger configured to cause heat exchange between refrigerant flowing therein and fluid passing therethrough; a utilization-side heat exchanger configured to cause heat exchange between refrigerant flowing therein and fluid passing therethrough; a high-pressure refrigerant pipe connected to each of a discharge port of the compressor and the heatsource-side heat exchanger; a liquid refrigerant pipe connected to each of the heatsource-side heat exchanger and the utilization-side heat exchanger; a low-pressure refrigerant pipe connected to each of the utilization-side heat exchanger and a suction port of the compressor; a liquid-side on-off valve disposed in the liquid refrigerant pipe; an expansion mechanism disposed in the liquid refrigerant pipe; and a gas-side on-off valve disposed in the low-pressure refrigerant pipe, the controller being configured to control the heat pump system to perform a refrigerant recovery operation for recovering refrigerant from a utilization-side piping section to a heatsource-side piping section by operating the compressor while the liquid-side on-off valve is closed and the gas-side on-off valve is open, the utilization-side piping section extending between the liquid-side on-off valve and the gas-side on-off valve and including at least the utilization-side heat exchanger, the heatsource-side piping section extending between the gas-side on-off valve and the liquid-side on-off valve and including at least the compressor, wherein the controller is configured to, in the refrigerant recovery operation, control the heat pump system such that the gas-side on-off valve starts closing when a predetermined valve-close condition is satisfied during the compressor is operating for recovering refrigerant, and such that the operation of the compressor for recovering refrigerant stops after the closing of the gas-side on-off valve started.

As soon as the operation of the compressor for recovering refrigerant stops, pressure at the suction port of the compressor starts increasing, and this pressure increase propagates in the low-pressure refrigerant pipe. Thus, if the operation of the compressor for recovering refrigerant stops when the gas-side on-off valve is still fully open, the refrigerant easily flows back to the utilization-side piping section through the low-pressure refrigerant pipe. In this regard, the controller with the above configuration stops the operation of the compressor after the closing of the gas-side on-off valve started. Hence, it is possible to prevent refrigerant recovered by the refrigerant recovery operation from flowing back to the utilization-side piping section. Furthermore, it is also possible to achieve the above effects in an existing heat pump system just by applying the controller according to the present invention to the existing heat pump system.

BRIEF DESCRIPTION OF DRAWINGS

FIG. 2 is a block diagram indicating a functional configuration of a controller shown in FIG. 1.

FIG. 3 is a first part of a flow chart indicating a process of a refrigerant recovery operation performed by the controller.

FIG. 4 is a second part of the flow chart indicating the process of the refrigerant recovery operation.

FIG. 5 is a table showing examples of conditions used as a compressor-stop condition.

DESCRIPTION OF EMBODIMENTS

A preferred embodiment of a heat pump system according to the present invention (hereafter referred to as "the present embodiment") will be described with reference to the drawings. For instance, the heat pump system according to the present embodiment is an air-conditioning system capable of a cooling operation and a heating operation by using R32 refrigerant.

<Circuit Configuration of System>

Figure 1:
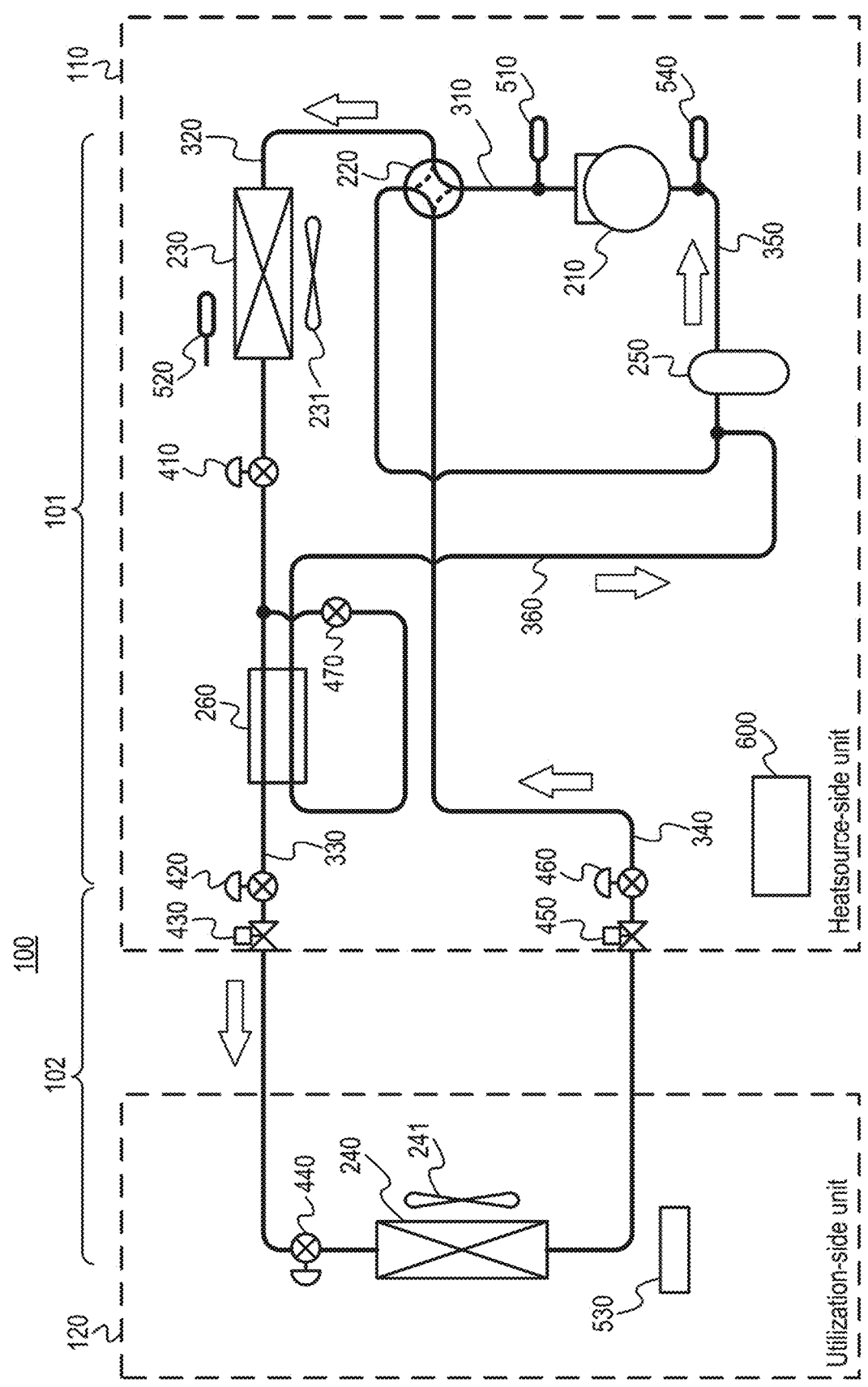
FIG. 1 is a schematic configuration view of a heat pump system according to a preferred embodiment of the present invention.

FIG. 1 is a schematic configuration view of a heat pump system according to the present embodiment.

As shown in FIG. 1, the heat pump system 100 comprises, a compressor 210, a mode switching mechanism 220, a heatsource-side heat exchanger 230, a utilization-side heat exchanger 240, and an accumulator 250. The heatsource-side heat exchanger 230 may be provided with a heatsource-side fan 231, and the utilization-side heat exchanger 240 is provided with a utilization-side fan 241.

The heat pump system 100 also comprises a discharge-side refrigerant pipe 310, a first gas refrigerant pipe 320, a liquid refrigerant pipe 330, a second gas refrigerant pipe 340, and a suction-side refrigerant pipe 350. The discharge-side refrigerant pipe 310 is connected to each of a discharge port of the compressor 210 and the mode switching mechanism 220. The first gas refrigerant pipe 320 is connected to each of the mode switching mechanism 220 and the heatsource-side heat exchanger 230. The liquid refrigerant pipe 330 is connected to each of the heatsource-side heat exchanger 230 and the utilization-side heat exchanger 240. The second gas refrigerant pipe 340 is connected to each of the utilization-side heat exchanger 240 and the mode switching mechanism 220. The suction-side refrigerant pipe 350 is connected to each of the mode switching mechanism 220 and a suction port of the compressor 210. The accumulator 250 is interposed in the suction-side refrigerant pipe 350.

The heat pump system 100 further comprises a heatsource-side expansion mechanism 410, a liquid-side on-off valve 420, a liquid-side stop valve 430, a utilization-side expansion mechanism 440, a gas-side stop valve 450, and a gas-side on-off valve 460. The heatsource-side expansion mechanism 410, the liquid-side on-off valve 420, the liquid-side stop valve 430, and the utilization-side expansion mechanism 440 are disposed in the liquid refrigerant pipe 330 in this order along a direction from the heatsource-side heat exchanger 230 towards the utilization-side heat exchanger 240. The gas-side stop valve 450 and the gas-side on-off valve 460 are disposed in the second gas refrigerant pipe 340 in this order along a direction from the utilization-side heat exchanger 240 towards the mode switching mechanism 220. The heatsource-side expansion mechanism 410 and the utilization-side expansion mechanism 440 each corresponds to an expansion mechanism according to the present invention.

The heat pump system 100 further comprises a refrigerant heat exchanger 260, a bypass pipe 360, and a bypass expansion mechanism 470. The refrigerant heat exchanger 260 is arranged to the liquid refrigerant pipe 330 at a location between the heatsource-side expansion mechanism 410 and the liquid-side on-off valve 420. The bypass pipe 360 is connected to each of the liquid refrigerant pipe 330 and the suction-side refrigerant pipe 350 in parallel with the utilization-side heat exchanger 240. More specifically, the bypass pipe 360 is connected to the liquid refrigerant pipe 330 at a point between the heatsource-side expansion mechanism 410 and the refrigerant heat exchanger 260, and connected to the suction-side refrigerant pipe 350 at a point between the mode switching mechanism 220 and the accumulator 250. A part of the bypass pipe 360 is arranged in the refrigerant heat exchanger 260. The bypass expansion mechanism 470 is disposed in the bypass pipe 360 at a point between the liquid refrigerant pipe 330 and the refrigerant heat exchanger 260.

The heat pump system 100 further comprises a discharge-side refrigerant state detector 510, an ambient temperature detector 520, a refrigerant leakage detector 530, and a suction-side refrigerant state detector 540. The discharge-side refrigerant state detector 510 is attached to the discharge-side refrigerant pipe 310. The ambient temperature detector 520 is disposed in the vicinity of the heatsource-side heat exchanger 230. The refrigerant leakage detector 530 is arranged in the vicinity of the utilization-side heat exchanger 240. The suction-side refrigerant state detector 540 is attached to the suction-side refrigerant pipe 350 at a point between the accumulator 250 and the compressor 210. The suction-side refrigerant state detector 540 corresponds to each of an evaporation temperature detector and a suction pressure detector according to the present invention.

The heat pump system 100 further comprises a controller 600. The controller 600 is connected to each of the above machineries by wired/wireless communication paths (not shown).

The heat pump system 100 may have a heatsource-side unit 110 and a utilization-side unit 120 as separated units. For instance, the heatsource-side unit 110 is a unit disposed outside, and the utilization-side unit 120 is a unit disposed in or close to a target space to be air-conditioned. In this case, at least the compressor 210, the gas-side on-off valve 460, the liquid-side on-off valve 420, and the controller 600 are disposed in the heatsource-side unit 110, and at least the utilization-side heat exchanger 240 is disposed in a utilization-side unit 120.

In the present embodiment, the liquid refrigerant pipe 330 and the second gas refrigerant pipe 340 extend between the heatsource-side unit 110 and the utilization-side unit 120. The utilization-side expansion mechanism 440, utilization-side heat exchanger 240, the utilization-side fan 241, and the refrigerant leakage detector 530 among the above-mentioned machineries are arranged in the utilization-side unit 120, and the other machineries are arranged in the heatsource-side unit 110. The controller 600 may be connected to the machineries in the utilization-side unit 120 via a sub-controller (not shown) arranged in the utilization-side unit 120. It can be said that the sub-controller in the utilization-side unit 120 is a part of the controller 600.

<Functions of Mechanisms>

The compressor 210 has a suction port and a discharge port, and configured to suction refrigerant via the suction port, compress the suctioned refrigerant internally, and discharge the compressed refrigerant from the discharge port.

The mode switching mechanism 220 is configured to switch between a cooling mode connection and a heating mode connection. By the cooling mode connection, the mode switching mechanism 220 connects the discharge-side refrigerant pipe 310 and the first gas refrigerant pipe 320 to each other to form a high-pressure refrigerant pipe, and connects the suction-side refrigerant pipe 350 and the second gas refrigerant pipe 340 to each other to form a low-pressure refrigerant pipe. By the heating mode connection, the mode switching mechanism 220 connects the discharge-side refrigerant pipe 310 and the second gas refrigerant pipe 340 to each other to form a high-pressure refrigerant pipe, and connects the suction-side refrigerant pipe 350 and the first gas refrigerant pipe 320 to each other to form a low-pressure refrigerant pipe. Here, the high-pressure refrigerant pipe is a pipe (a flow path) connected to each of the discharge port of the compressor 210 and the heatsource-side heat exchanger 230, and the low-pressure refrigerant pipe is a pipe (a flow path) connected to each of the utilization-side heat exchanger 240 and the suction port of the compressor 210. The mode switching mechanism 220 may be a four-way selector valve.

The heatsource-side heat exchanger 230 is configured to allow refrigerant to flow therein from the first gas refrigerant pipe 320 to the liquid refrigerant pipe 330 and vice versa. The heatsource-side heat exchanger 230 is also configured to cause heat exchange between refrigerant flowing therein and fluid passing therethrough. In the present embodiment, the heatsource-side heat exchanger 230 is configured to allow outdoor air to pass therethrough. The heatsource-side fan 231 is configured to promote the flow of the air passing through the heatsource-side heat exchanger 230.

The utilization-side heat exchanger 240 is configured to allow refrigerant to flow therein from the liquid refrigerant pipe 330 to second gas refrigerant pipe 340 and vice versa. The utilization-side heat exchanger 240 is also configured to cause heat exchange between refrigerant flowing therein and fluid passing therethrough. In the present embodiment, the utilization-side heat exchanger 240 is configured to allow indoor air in the target space and/or outdoor air to pass therethrough. The utilization-side fan 241 is configured to promote the flow of the air passing through the utilization-side heat exchanger 240. The air which has passed through the utilization-side heat exchanger 240 is supplied to the target space.

The accumulator 250 is configured to separate gas refrigerant from the refrigerant flown into the accumulator 250 and forward the separated gas refrigerant. The accumulator 250 is also configured to accumulate excess refrigerant in the heat pump circuit of the heat pump system 100.

The refrigerant heat exchanger 260 is configured to cause heat exchange between refrigerant flowing in the liquid refrigerant pipe 330 and refrigerant which has flown into the bypass pipe 360 and has been decompressed and expanded by the bypass expansion mechanism 470. The refrigerant heat exchanger 260 may have two flow channels which form a part of the liquid refrigerant pipe 330 and a part of the bypass pipe 360, respectively, and have thermal conductance therebetween.

The heatsource-side expansion mechanism 410 is configured to decompress and expand refrigerant flowing therethrough when the heatsource-side expansion mechanism 410 is partly open. More specifically, the heatsource-side expansion mechanism 410 is configured to, under control by the controller 600, decompress and expand refrigerant flowing in the liquid refrigerant pipe 330 from the utilization-side heat exchanger 240 towards the heatsource-side heat exchanger 230 during the heat pump system 100 is in the heating operation. The heatsource-side expansion mechanism 410 may be an electric expansion valve.

The liquid-side on-off valve 420 is configured to regulate a flow of refrigerant therethrough. More specifically, the liquid-side on-off valve 420 is configured to, under control by the controller 600, close off the flow of refrigerant in at least a part of the liquid refrigerant pipe 330 when the liquid-side on-off valve 420 is fully closed. The liquid-side on-off valve 420 may be an electric expansion valve.

The liquid-side stop valve 430 is configured to stop a flow of refrigerant therethrough when manually operated to close. The liquid-side stop valve 430 is kept fully open unless manually operated to close. The liquid-side stop valve 430 may be a service valve configured to be switched between an open state and a close state while allowing refrigerant to be charged to and discharged from the heat pump circuit therethrough.

The utilization-side expansion mechanism 440 is configured to decompress and expand refrigerant flowing therethrough when the utilization-side expansion mechanism 440 is partly open. More specifically, the utilization-side expansion mechanism 440 is configured to, under control by the controller 600, decompress and expand refrigerant flowing in the liquid refrigerant pipe 330 from the heatsource-side heat exchanger 230 towards the utilization-side heat exchanger 240 during the heat pump system 100 is in the cooling operation. The utilization-side expansion mechanism 440 may be an electric expansion valve.

The gas-side stop valve 450 is configured to stop a flow of refrigerant therethrough when manually operated to close. The gas-side stop valve 450 is kept fully open unless manually operated to close. The liquid-side stop valve 430 may be a service valve configured to be switched between an open state and a close state while allowing refrigerant to be charged to and discharged from the heat pump circuit therethrough.

The gas-side on-off valve 460 is configured to regulate a flow of refrigerant therethrough. More specifically, the gas-side on-off valve 460 is configured to, under control by the controller 600, close off the flow of refrigerant in at least a part of the liquid refrigerant pipe 330 when the gas-side on-off valve 460 is fully closed. The gas-side on-off valve 460 may be an electric expansion valve.

In general, the diameter of the second gas refrigerant pipe 340 is greater than that of the liquid refrigerant pipe 330. Thus, Cv value of the gas-side on-off valve 460 is greater than Cv value of liquid-side on-off valve 420. For instance, Cv value of the gas-side on-off valve 460 is over five times larger than Cv value of the liquid-side on-off valve 420. Cv value of the gas-side on-off valve 460 may be 5, and Cv value of the liquid-side on-off valve 420 may be 0.6. In this case, Cv value of the heatsource-side expansion mechanism 410 may be 0.3.

The bypass expansion mechanism 470 is configured to decompress and expand refrigerant flowing therethrough when the bypass expansion mechanism 470 is partly open. More specifically, the bypass expansion mechanism 470 is configured to, under control by the controller 600, decompress and expand refrigerant flowing in the bypass pipe 360 from the liquid refrigerant pipe 330 towards the suction-side refrigerant pipe 350 during the heat pump system 100 is operating in the cooling operation and a refrigerant recovery operation mentioned later. The bypass expansion mechanism 470 may be an electric expansion valve.

In the following descriptions, the heatsource-side expansion mechanism 410, the liquid-side on-off valve 420, the utilization-side expansion mechanism 440, the gas-side on-off valve 460, and the bypass expansion mechanism 470 are collectively called "the control valves" as necessary.

The discharge-side refrigerant state detector 510 is configured to detect pressure and/or temperature of refrigerant flowing in the discharge-side refrigerant pipe 310, and transmit discharge-side refrigerant information indicating the detected pressure (hereinafter referred to as "the discharge pressure Pc") and/or the detected temperature (hereinafter referred to as "the discharge temperature Tdi") to the controller 600 continuously or regularly. Alternatively, or additionally, the discharge-side refrigerant state detector 510 may transmit the discharge-side refrigerant information when the detected discharge pressure Pc and/or discharge temperature Tdi has changed by a predetermined amount, and/or upon receiving a request from the controller 600. The discharge-side refrigerant state detector 510 may be a capacitive pressure sensor and/or a thermistor.

The ambient temperature detector 520 is configured to detect temperature of the fluid (the outdoor air) which passes through the heatsource-side heat exchanger 230, and transmit ambient temperature information indicating the detected temperature (hereinafter referred to as "the ambient temperature Ta") to the controller 600 continuously or regularly. Alternatively, or additionally, the ambient temperature detector 520 may transmit the ambient temperature information when the detected temperature Ta has changed by a predetermined amount, and/or upon receiving a request from the controller 600. The ambient temperature detector 520 may be a thermistor disposed in an air-flow path of the outdoor air flowing through the heatsource-side heat exchanger 230 on the upstream side of the heatsource-side heat exchanger 230. In other words, the ambient temperature detector 520 is configured to detect temperature of fluid which is subject to heat exchange with refrigerant in the heatsource-side heat exchanger 230.

The refrigerant leakage detector 530 is configured to detect an occurrence of refrigerant leakage in the utilization-side unit 120 and transmit refrigerant leakage information to the controller 600 continuously or regularly. The refrigerant leakage information is information indicating whether or not a refrigerant leakage in the utilization-side unit 120 (hereinafter referred to simply as "the refrigerant leakage") has occurred. Alternatively, or additionally, the refrigerant leakage detector 530 may transmit the refrigerant leakage information when the refrigerant leakage has occurred.

The refrigerant leakage detector 530 may be a semiconductor gas sensor reactive to the refrigerant used in the heat-pump system 100. In this case, the refrigerant leakage detector 530 detects a concentration of the refrigerant in an air surrounding the refrigerant leakage detector 530, and outputs a detection value indicating the detected concentration as the refrigerant leakage information. Whether or not the detection value is greater than a predetermined threshold indicates whether the refrigerant leakage has occurred. The refrigerant leakage detector 530 is disposed in the utilization-side unit 120 or the target space. In a case where refrigerant which is heavier than an air, such as R32 refrigerant, the refrigerant leakage detector 530 is preferably disposed on or close to an inner bottom surface of an air chamber (not shown) in which utilization-side heat exchanger 240 is arranged.

The suction-side refrigerant state detector 540 is configured to detect pressure of refrigerant flowing in the suction-side refrigerant pipe 350 and detect evaporation temperature of refrigerant flowing in the suction-side refrigerant pipe 350. The suction-side refrigerant state detector 540 is further configured to transmit suction-side refrigerant information indicating the detected pressure (hereinafter referred to as "the suction pressure Pe") and the detected evaporation temperature TeS to the controller 600 continuously or regularly. Alternatively, or additionally, the suction-side refrigerant state detector 540 may transmit the suction-side refrigerant information when the detected suction pressure Pe and/or evaporation temperature TeS has changed by a predetermined amount, and/or upon receiving a request from the controller 600.

The suction-side refrigerant state detector 540 may include a capacitive pressure sensor configured to detect pressure of refrigerant flowing in the suction-side refrigerant pipe 350, and a thermistor configured to detect temperature of refrigerant flowing in the suction-side refrigerant pipe 350. The suction-side refrigerant state detector 540 may further include a storage media and a calculator. In this case, the storage memory stores a table information indicating known correlation between pressure of the refrigerant and evaporation temperature TeS of the refrigerant at the pressure in advance. The calculator calculates the evaporation temperature TeS of the refrigerant based on the detected pressure and the table. Yet, this calculation may be performed by the controller 600.

In the following descriptions, the discharge-side refrigerant state detector 510, the ambient temperature detector 520, the refrigerant leakage detector 530, and the suction-side refrigerant state detector 540 are collectively called "the sensors" as necessary.

The controller 600 is configured to switch the mode switching mechanism 220 between the cooling mode connection and the heating mode connection in accordance with an instruction made by a user or an external controller, and control the cooling operation and the heating operation of the heat pump system 100.

In the cooling operation, the controller 600 controls the machineries of the heat pump system 100 such that refrigerant discharged from the compressor 210 flows through the heatsource-side heat exchanger 230, each of the utilization-side heat exchanger 240 and the bypass pipe 360, and the accumulator 250 in this order, and is suctioned to the compressor 210. The arrows show in FIG. 1 indicates a flow direction of refrigerant during the heat pump system 100 is in the cooling operation. In the cooling operation, the heatsource-side unit 110 functions as a condenser, and the utilization-side unit 120 functions as an evaporator.

In the heating operation, the controller 600 controls the machineries such that refrigerant discharged from the compressor 210 flows through the utilization-side heat exchanger 240, the heatsource-side heat exchanger 230, and the accumulator 250 in this order, and is suctioned to the compressor 210. It can be said that the first gas refrigerant pipe 320 is a part of the suction-side refrigerant pipe 350 and the second gas refrigerant pipe 340 is a part of the discharge-side refrigerant pipe 310 when the mode switching mechanism 220 is in the heating mode connection. In the heating operation, the heatsource-side unit 110 functions as an evaporator, and the utilization-side unit 120 functions as a condenser.

The controller 600 is further configured to control the heat pump system 100 to perform a refrigerant recovery operation when an occurrence of the refrigerant leakage has been detected. The refrigerant recovery operation is an operation for recovering refrigerant from a utilization-side piping section 102 to a heatsource-side piping section 101 by operating the compressor 210 while the liquid-side on-off valve 420 is closed and the gas-side on-off valve 460 is open. Here, the heatsource-side piping section 101 is a piping section extending between the gas-side on-off valve 460 and the liquid-side on-off valve 420 and including at least the compressor 210. The heatsource-side piping section 101 also includes the heatsource-side heat exchanger 230. The utilization-side piping section 102 is a piping section extending between the liquid-side on-off valve 420 and the gas-side on-off valve 460 and including at least the utilization-side heat exchanger 240.

In the present embodiment, the heatsource-side piping section 101 includes a part of the second gas refrigerant pipe 340 that is connected to the mode switching mechanism 220, the mode switching mechanism 220, the suction-side refrigerant pipe 350, the accumulator 250, the compressor 210, the discharge-side refrigerant pipe 310, the first gas refrigerant pipe 320, the heatsource-side heat exchanger 230, a part of the liquid refrigerant pipe 330 that is connected to the heatsource-side heat exchanger 230, the heatsource-side expansion mechanism 410, the refrigerant heat exchanger 260, the bypass pipe 360, and the bypass expansion mechanism 470. The utilization-side piping section 102 includes a part of the liquid refrigerant pipe 330 that is connected to the utilization-side heat exchanger 240, the liquid-side stop valve 430, the utilization-side expansion mechanism 440, a part of the second gas refrigerant pipe 340 that is connected to the utilization-side heat exchanger 240, and the gas-side stop valve 450.

In the refrigerant recovery operation, the controller 600 controls the machineries of the heat pump system 100 such that refrigerant present in the utilization-side piping section 102 is drawn towards the suction port of the compressor 210 via the second gas refrigerant pipe 340 and then circulated within the heatsource-side piping section 101 through the heatsource-side heat exchanger 230, the bypass pipe 360, and the accumulator 250. The refrigerant is accumulated mainly in the accumulator 250 and the heatsource-side heat exchanger 230 during being circulated within the heatsource-side piping section 101.

The controller 600 is further configured to, in the refrigerant recovery operation, control the compressor 210 such that, when the ambient temperature Ta is higher than or equal to a predetermined ambient temperature value Ta_th, increase rate of the compressor rotation speed is low compared with increase rate of the compressor rotation speed of when the ambient temperature Ta is lower than the predetermined ambient temperature value Ta_th. Here, the "compressor rotation speed" means rotation speed of the compressor 210, which is expressed the number of rotations per minute for instance. The increase rate of the compressor rotation speed is an increased amount of the compressor rotation speed per unit time for instance.

The controller 600 is further configured to, in the refrigerant recovery operation, control the heat pump system 100 such that the gas-side on-off valve 460 starts closing when a predetermined valve-close condition is satisfied during the compressor 210 is operating for recovering refrigerant. The controller 600 is also configured to control the heat pump system 100 such that the operation of the compressor 210 for recovering refrigerant stops after the closing of the gas-side on-off valve 460 started. The details regarding the controller 600 is explained hereinafter.

<Functional Configuration of Controller>

The controller 600 includes an arithmetic circuit such as a CPU (Central Processing Unit), a work memory used by the CPU such as a RAM (Random Access Memory), a recording medium storing control programs and information used by the CPU such as a ROM (Read Only Memory), and a timer, although they are not shown. The controller 600 is configured to perform information processing and signal processing by the CPU executing the control programs to control operation of the heat pump system 100. Thus, functions of the controller 600 are achieved by execution of the programs.

FIG. 2 is a block diagram indicating a functional configuration of the controller 600.

As shown in FIG. 2, the controller 600 has a storage section 610, an information input section 620, a normal operation controller 630, an information output section 640, and a refrigerant recovery controller 650.

The storage section 610 stores information in a form readable by the refrigerant recovery controller 650. The stored information may include conditions and values used by the normal operation controller 630 and the refrigerant recovery controller 650. The stored information may be prepared in advance based on experiments or the like.

The information input section 620 is configured to acquire, from the sensors, information necessary for controlling the operation of the heat pump system 100, and transfer the acquired information to the refrigerant recovery controller 650. The information input section 620 may further transfer the acquired information to the normal operation controller 630. The information to be acquired includes the discharge-side refrigerant information, the ambient temperature information, the refrigerant leakage information, and the suction-side refrigerant information mentioned above. The information input section 620 may include a wired/wireless communication interface for communicating with each of the sensors. The information input section 620 may transmit requests to the sensors requesting for information under control by the refrigerant recovery controller 650.

The normal operation controller 630 is configured to control the cooling operation and the heating operation of the heat pump system 100. For the cooling operation, the normal operation controller 630 is configured to control the mode switching mechanism 220 to switch to or maintain the cooling mode connection, control the heatsource-side expansion mechanism 410, the liquid-side on-off valve 420, and the gas-side on-off valve 460 to fully open, and control the utilization-side expansion mechanism 440 and the bypass expansion mechanism 470 to be partly open. For the heating operation, the normal operation controller 630 is configured to control the mode switching mechanism 220 to switch to or maintain the heating mode connection, control the gas-side on-off valve 460, the utilization-side expansion mechanism 440, and the liquid-side on-off valve 420 to fully open, control the heatsource-side expansion mechanism 410 to be partly open, and control the bypass expansion mechanism 470 to be fully closed. The normal operation controller 630 is also configured to control the compressor 210, the heatsource-side fan 231, and the utilization-side fan 241 to operate for both the cooling operation and the heating operation. The normal operation controller 630 may include a wired/wireless communication interface for communicating with each of the mode switching mechanism 220, the control valves, the compressor 210, the heatsource-side fan 231, and the utilization-side fan 241.

Regarding the control of the compressor 210, the normal operation controller 630 is configured to control the compressor rotation speed such that the evaporation temperature TeS approaches a target evaporation temperature value TeS_tgt. The target evaporation temperature value TeS_tgt is used regardless of whether the heat pump system 100 is in the cooling operation or the refrigerant recovery operation, but the value of the target evaporation temperature value TeS_tgt is different as explained later. The normal operation controller 630 is also configured to monitor whether the discharge pressure Pc is kept below a predetermined threshold, and decrease the compressor rotation speed when the discharge pressure Pc has exceeded the predetermined threshold (i.e. a drooping control is performed).

The normal operation controller 630 may also be configured to control the heat pump system 100 under control by the refrigerant recovery controller 650 during the refrigerant recovery operation.

The information output section 640 is configured to output information to a user of the heat pump system 100 or an external device such as an information output device under control by the refrigerant recovery controller 650. The information output section 640 may include a display device, an electric light, a loudspeaker, a wired/wireless communication interface for transmitting information to an external device. Thus, the information output section 640 is configured to output the information by image, light, sound, communication signal or the like.

The refrigerant recovery controller 650 is configured to perform the refrigerant recovery operation, by using the normal operation controller 630 for instance. The refrigerant recovery controller 650 has a leakage detection section 651, a temperature detection section 652, an acceleration rate switching section 653, and a timing control section 654.

The leakage detection section 651 is configured to detect an occurrence of the refrigerant leakage based on the refrigerant leakage information from the refrigerant leakage detector 530. For instance, the leakage detection section 651 is configured to determine that the refrigerant leakage has occurred when the concentration of refrigerant detected by the refrigerant leakage detector 530 is greater than a predetermined concentration value. Yet, this determination may be performed by the refrigerant leakage detector 530 or the information input section 620. A moving average of time-series data of the detected concentration may be used for the above determination. The leakage detection section 651 may passively receive the refrigerant leakage information continuously or regularly transmitted by the refrigerant leakage detector 530, or actively acquire the refrigerant leakage information by regularly sending a request to the refrigerant leakage detector 530.

The temperature detection section 652 is configured to obtain the ambient temperature information from the ambient temperature detector 520. The temperature detection section 652 may passively receive the ambient temperature information continuously or regularly transmitted by the ambient temperature detector 520, or actively acquire the ambient temperature information by sending a request to the ambient temperature detector 520 when the leakage detection section 651 has determined that the refrigerant leakage has occurred.

The acceleration rate switching section 653 is configured to set a target increase rate value Rv_tgt based on whether the acquired ambient temperature Ta is higher than or equal to the predetermined ambient temperature value Ta_th. More specifically, when the ambient temperature Ta is higher than or equal to than the predetermined ambient temperature value Ta_th, the acceleration rate switching section 653 is configured to set the target increase rate value Rv_tgt so as to be low compared with the target increase rate value Rv_tgt of when the ambient temperature Ta is lower than the predetermined ambient temperature value Ta_th.

The timing control section 654 is configured to perform the refrigerant recovery operation controlling the timings of events in the refrigerant recovery operation. In particular, the timing control section 654 is configured to control the compressor 210 to increase the compressor rotation speed by the set target increase rate value Rv_tgt, and control the gas-side on-off valve 460 to close and control the compressor 210 to stop the operation for recovering refrigerant after the closing of the gas-side on-off valve 460 started. The functions of the timing control section 654 are detailed in the following explanations on the operation by the controller 600.

<Operation by Controller>

The leakage detection section 651 of the controller 600 repeats a determination whether the refrigerant leakage has occurred during the compressor 210 is not operating, during the cooling operation, and during the heating operation. When an occurrence of the refrigerant leakage has been detected, the controller 600 starts the refrigerant recovery operation.

If an occurrence of the refrigerant leakage has been detected during the compressor 210 is not operating and the mode switching mechanism 220 is not in the cooling mode connection, the controller 600 controls the mode switching mechanism 220 to switch to the cooling mode connection, and then starts the refrigerant recovery operation. If an occurrence of the refrigerant leakage has been detected during the cooling operation, the controller 600 controls the compressor 210 to stop, and then starts the refrigerant recovery operation. If an occurrence of the refrigerant leakage has been detected during the heating operation, the controller 600 controls the mode switching mechanism 220 to switch to the cooling mode connection, controls the compressor 210 to stop, and then starts the refrigerant recovery operation. In any cases, the controller 600 is configured to control the mode switching mechanism 220 to maintain the cooling mode connection during the refrigerant recovery operation is performed.

When an occurrence of the refrigerant leakage has been detected, the refrigerant recovery controller 650 may output alarm information via the information output section 640 to notify the user of the occurrence of the refrigerant leakage. It is preferable that the refrigerant recovery controller 650 transmits a signal to the utilization-side unit 120 such that the alarm information is also outputted from a display device, an electric light, a loudspeaker or the like (not shown) of the utilization-side unit 120.

FIG. 3 is a first part of a flow chart indicating the process of the refrigerant recovery operation performed by the controller 600, and FIG. 4 is a second part of the flow chart.

In step S1100, the timing control section 654 of the controller 600 controls the heatsource-side expansion mechanism 410 to fully open and controls the bypass expansion mechanism 470 to be fully open. Here, the gas-side on-off valve 460 should already be open, and the compressor 210 is still stopped. Thereby, refrigerant can smoothly circulate within the heatsource-side piping section 101 when the operation of the compressor 210 is started afterwards.

In step S1200, the timing control section 654 controls the liquid-side on-off valve 420 to close. Thereby, refrigerant can be prevented from flowing into the utilization-side piping section 102 via the liquid refrigerant pipe 330 when the operation of the compressor 210 is started afterwards.

In step S1300, the timing control section 654 sets a lower value to the target evaporation temperature value TeS_tgt which is used for controlling the compressor rotation speed, compared with a value normally used in the cooling operation. More specifically, the timing control section 654 changes the target evaporation temperature value TeS_tgt from a first target evaporation temperature value TeS_1 to a second target evaporation temperature value TeS_2. The first target evaporation temperature value TeS_1 is a default value, and the second target evaporation temperature value TeS_2 is a value lower than the first target evaporation temperature value TeS_1. For instance, the first target evaporation temperature value TeS_1 is −6 degree Celsius which is used in the normal cooling operation, and the second target evaporation temperature value TeS_2 is −30 degree Celsius. Thereby, the compressor 210 can keep operating in the refrigerant recovery operation even if the evaporation temperature TeS becomes low. Yet, the measure for keeping the compressor 210 operating is not limited to this.

In step S1400, the timing control section 654 controls the utilization-side expansion mechanism 440 to open. Thereby, refrigerant can smoothly flow out from the utilization-side piping section 102 when the operation of the compressor 210 is started afterwards. It is preferable that the utilization-side expansion mechanism 440 is gradually opened.

In step S1500, the timing control section 654 controls the compressor 210 to start operating. Thereby, refrigerant present in utilization-side piping section 102 can start being drawn towards the heatsource-side piping section 101 via the second gas refrigerant pipe 340. It is preferable that operation of the compressor 210 starts only after a first predetermined time T_1 has elapsed after operation of the compressor 210 stopped. For instance, the first predetermined time T_1 is 1 minute. Thereby, it is possible to reliably complete the preparations of the control valves before the operation of the compressor 210 is started.

By the above steps S1100 to S1500, if the compressor can start operating in a state where the liquid-side on-off valve is closed and the heatsource-side expansion mechanism 410, the bypass expansion mechanism 470, the utilization-side expansion mechanism 440, and the gas-side on-off valve 460 are open. Yet, the measure for preparing such a state of the control valves are not limited to the above steps S1100 to S1400.

In step S1600, the temperature detection section 652 acquires the ambient temperature Ta, and the acceleration rate switching section 653 determines whether the acquired ambient temperature Ta is lower than the predetermined ambient temperature value Ta_th. A moving average of time-series data of the detected ambient temperature Ta may be used for the above determination. If the ambient temperature Ta is lower than the predetermined ambient temperature value Ta_th (S1600: Yes), the process proceeds to step S1700. If the ambient temperature Ta is higher than or equal to the predetermined ambient temperature value Ta_th (S1600: No), the process proceeds to step S1800. For instance, the predetermined ambient temperature value Ta_th is 35 degree Celsius.

In step S1700, the acceleration rate switching section 653 sets a first predetermined increase rate value Rv_1 to the target increase rate value Rv_tgt.

In step S1800, the acceleration rate switching section 653 sets a second predetermined increase rate value Rv_2 to the target increase rate value Rv_tgt. Here, the second predetermined increase rate value Rv_2 is lower than the first predetermined increase rate value Rv_1.

In step S1900, the timing control section 654 controls the compressor 210 such that the compressor rotation speed starts increasing by the target increase rate value Rv_tgt with the set value. The timing control section 654 may control the compressor 210 to start rotating at a predetermined frequency and then increase the compressor rotation speed by increasing the frequency by a predetermined step at a predetermined interval. The predetermined step may be determined for each interval based on the evaporation temperature TeS or the like. In this case, the target increase rate value Rv_tgt may be used as an upper limit of the increased step in each interval. In other words, the timing control section 654 may set an upper limit to the step of frequency to be increased in each interval in the step S1800, whereas setting substantially no upper limit in the step S1700.

The compressor 210 is controlled to increase the frequency gradually such that the evaporation temperature TeS approaches the target evaporation temperature value TeS_tgt as mentioned above. Yet, during the refrigerant recovery operation, the evaporation temperature TeS would not get to the target evaporation temperature value TeS_tgt since the target evaporation temperature value TeS_tgt has been lowered in the step S1300. Thus, the compressor 210 keeps operating while increasing its rotation speed. When the process proceeded to the step S1800, it takes longer than when the process proceeded to the step S1700 until the compressor rotation speed reaches the same speed.

By the above steps S1600 to S1900, it is possible to increase the compressor rotation speed while making the increase speed of the compressor rotation speed slower when the ambient temperature Ta is relatively high.

In step S2000, the timing control section 654 determines whether a predetermined valve-close condition is satisfied. The predetermined valve-close condition is a condition indicating that refrigerant has been recovered from the utilization-side piping section 102 to the heatsource-side piping section 101 sufficiently.

In the present embodiment, the predetermined valve-close condition is that the suction pressure Pe has been kept below a first predetermined suction pressure value Pe_1 for a second predetermined time T_2. For this determination, the timing control section 654 acquires the suction pressure Pe and determine whether the above predetermined valve-close condition is satisfied. A moving average of time-series data of the detected suction pressure Pe may be used for the above determination. For instance, the first predetermined suction pressure value Pe_1 is 3.0 kilopascal and the second predetermined time T_2 is 30 seconds. Yet, the duration for the second predetermined time T_2 may be excluded from the above predetermined valve-close condition.

If the suction pressure Pe is not below the first predetermined suction pressure value Pe_1, or the suction pressure Pe is below the first predetermined suction pressure value Pe_1 but it has not been kept for the second predetermined time T_2 yet (S2000: No), the determination of the step S2200 is repeated. If the suction pressure Pe has been kept below the first predetermined suction pressure value Pe_1 for the second predetermined time T_2 (S2000: Yes), the process proceeds to step S2100.

In step S2100, the timing control section 654 controls the gas-side on-off valve 460 to start closing. Thereby, the gas-side on-off valve 460 is closed to prevent refrigerant from flowing back from the heatsource-side piping section 101 to the utilization-side piping section 102 via the second gas refrigerant pipe 340, even if the operation of the compressor 210 is stopped afterwards. It is preferable that the gas-side on-off valve 460 is gradually closed. For instance, the timing control section 654 controls the gas-side on-off valve 460 to start closing by sending a shut-off signal to the gas-side on-off valve 460. The shut-off signal may be a pulse signal with pulse-number decreasing to zero.

In step S2200, the timing control section 654 determines whether a predetermined compressor-stop condition is satisfied. The predetermined compressor-stop condition is a condition indicating that it is possible to prevent refrigerant from flowing back from the heatsource-side piping section 101 to the utilization-side piping section 102 via the second gas refrigerant pipe 340 even if the operation of the compressor 210 is stopped, and/or that the operation of the compressor 210 needs to be stopped for safety reason or the like. If the predetermined compressor-stop condition is not satisfied (S2200: No), the determination of the step S2200 is repeated. If the predetermined compressor-stop condition is satisfied (S2200: Yes), the process proceeds to step S2300.

FIG. 5 is a table showing examples of the compressor-stop condition. For instance, the compressor-stop condition includes at least one of first to fourth conditions shown in FIG. 5.

The first condition is that change rate of the discharge pressure Pc (hereinafter referred to as "the discharge pressure change rate IRpcl") is below a predetermined discharge pressure change rate value Rpc_th, and change rate of the suction pressure Pe (hereinafter referred to as "the suction pressure change rate IRpel") is below a predetermined suction pressure change rate value Rpe_th. The predetermined suction pressure change rate value Rpe_th may be equal to or different from the predetermined discharge pressure change rate value Rpc_th. Here, the discharge pressure change rate IRpcl may be an absolute value of changed amount of the discharge pressure Pc per unit time, and the suction pressure change rate IRpel may be an absolute value of changed amount of the suction pressure Pe per unit time. For instance, both the predetermined discharge pressure change rate value Rpc_th and the predetermined suction pressure change rate value Rpe_th are 0.2 kgf/cm$^2$ per second. A moving average of time-series data of the detected discharge pressure Pc and a moving average of time-series data of the detected suction pressure Pe may be used for determination of this condition.

The second condition is that the suction pressure Pe is below a second predetermined suction pressure value Pe_2 which is lower than the first predetermined suction pressure value Pe_1 used in the step S2000. For instance, the second predetermined suction pressure value Pe_2 is 1.0 kilopascal. A moving average of time-series data of the detected suction pressure Pe may be used for determination of this condition.

The third condition is that a third predetermined time T_3 has elapsed after the closing of the gas-side on-off valve 460 was completed. For instance, the third predetermined time T_3 is 2 minutes. Yet, the third predetermined time T_3 may be zero. The timing control section 654 may detect the completion of the closing of the gas-side on-off valve 460 by using a sensor.

The fourth condition is that a fourth predetermined time T_4 has elapsed after the closing of the gas-side on-off valve 460 started in step S2100. It is preferable that the fourth predetermined time T_4 is longer than a time period that it takes for the gas-side on-off valve 460 to close.

The timing control section 654 may use only one of the above first to fourth conditions. Alternatively, the timing control section 654 may use a combination of any two or more of the above first to fourth conditions as an AND condition (a logical conjunction) or an OR condition (a logical disjunction). Yet, the predetermined compressor-stop condition is not limited to these. In any case, the timing control section 654 is configured to acquire the information necessary for determining the predetermined compressor-stop condition.

In step S2300 of FIG. 4, the timing control section 654 controls the utilization-side expansion mechanism 440 to close.

In step S2400, the timing control section 654 controls the compressor 210 to stop operating, and controls the heatsource-side expansion mechanism 410 and the bypass expansion mechanism 470 to close. For instance, the timing control section 654 controls the compressor 210 to stop operating by controlling a power supply to the compressor 210 to stop.

By the above steps S2000 to S2400, it is possible to stop operation of the compressor 210 and close the control valves when the refrigerant recovery operation can be or should be finished. Then, the refrigerant recovery operation is terminated. The gas-side on-off valve 460 starts closing before the operation of the compressor 210 when the refrigerant recovery operation is to be finished. The timing control section 654 may terminate the refrigerant recovery operation when a predetermined termination condition has been satisfied, regardless of the above predetermined valve-close condition and predetermined compressor-stop condition. Yet, even in such a case, it is desirable that the timing control section 654 controls the compressor 210 to stop after the closure of the gas-side on-off valve 460 has been started, or more preferably after the closure of the gas-side on-off valve 460 has been completed.

When the refrigerant recovery operation has been terminated, the refrigerant recovery controller 650 may output termination information via the information output section 640 to notify the user of the termination of the refrigerant recovery operation. It is preferable that the refrigerant recovery controller 650 transmits a signal to the utilization-side unit 120 such that the termination information is also outputted from the display device, the electric light, the loudspeaker or the like of the utilization-side unit 120.

After the termination of the refrigerant recovery operation, the user or a maintenance person of the heat pump system 100 may repair a refrigerant leaking point of the utilization-side unit 120. Since most of refrigerant has been evacuated from the utilization-side piping section 102, the repair can be safely performed.

Advantageous Effect

As described above, the heat pump system 100 is configured to, in the refrigerant recovery operation, control the heat pump system 100 such that the gas-side on-off valve 460 starts closing when a predetermined valve-close condition is satisfied during the compressor 210 is operating for recovering refrigerant, and such that the operation of the compressor 210 for recovering refrigerant stops after the closing of the gas-side on-off valve 460 started. Thereby, it is possible to prevent refrigerant which has been recovered to a heatsource-side piping section 101 from flowing back to the utilization-side piping section 102.

Modifications

The configurations and operations of the heat pump system 100 and/or the controller 600 are not limited to the configurations and operations explained above, unless departing from the scope of the present invention as defined in the appended claims. For instance, some of the elements of the heat pump system 100 and some of the operational steps performed by the controller 600 can be omitted.

For example, in a case of a refrigeration system, i.e. where the heating operation is not required, the mode switching mechanism 220 and the heatsource-side expansion mechanism 410 can be omitted. In a case where required performance of the heat pump system 100 not high, the refrigerant heat exchanger 260 can be omitted. In a case where there is no bypass pipe is connected to each of the liquid refrigerant pipe 330 and the suction-side refrigerant pipe 350 in parallel with the utilization-side heat exchanger 240, the accumulator 250 can be omitted. In a case where sufficient air flow through the heatsource-side heat exchanger 230 and/or utilization-side heat exchanger 240 is ensured, the heatsource-side fan 231 and/or the utilization-side fan 241 can be omitted. In a case where the heat pump system 100a is formed as a single unit, the liquid-side stop valve 430 and the gas-side stop valve 450 can be omitted.

The controller 600 may perform the determination whether the refrigerant leakage has occurred only when a predetermined condition is satisfied. For instance, the controller 600 may repeat the determination only during the compressor 210 is not operating. If an occurrence of the refrigerant leakage is indicated by a user operation, the refrigerant leakage detector 530 can be omitted. Moreover, the refrigerant recovery operation may be triggered by other events, such as an input of an instruction requesting a start of the refrigerant recovery operation regardless of whether the refrigerant leakage has occurred. The steps of the controller 600 pertaining to the omitted elements can be omitted. One or more of the sensors do not necessary for the process by the controller 600 can be omitted.

Figure 6:
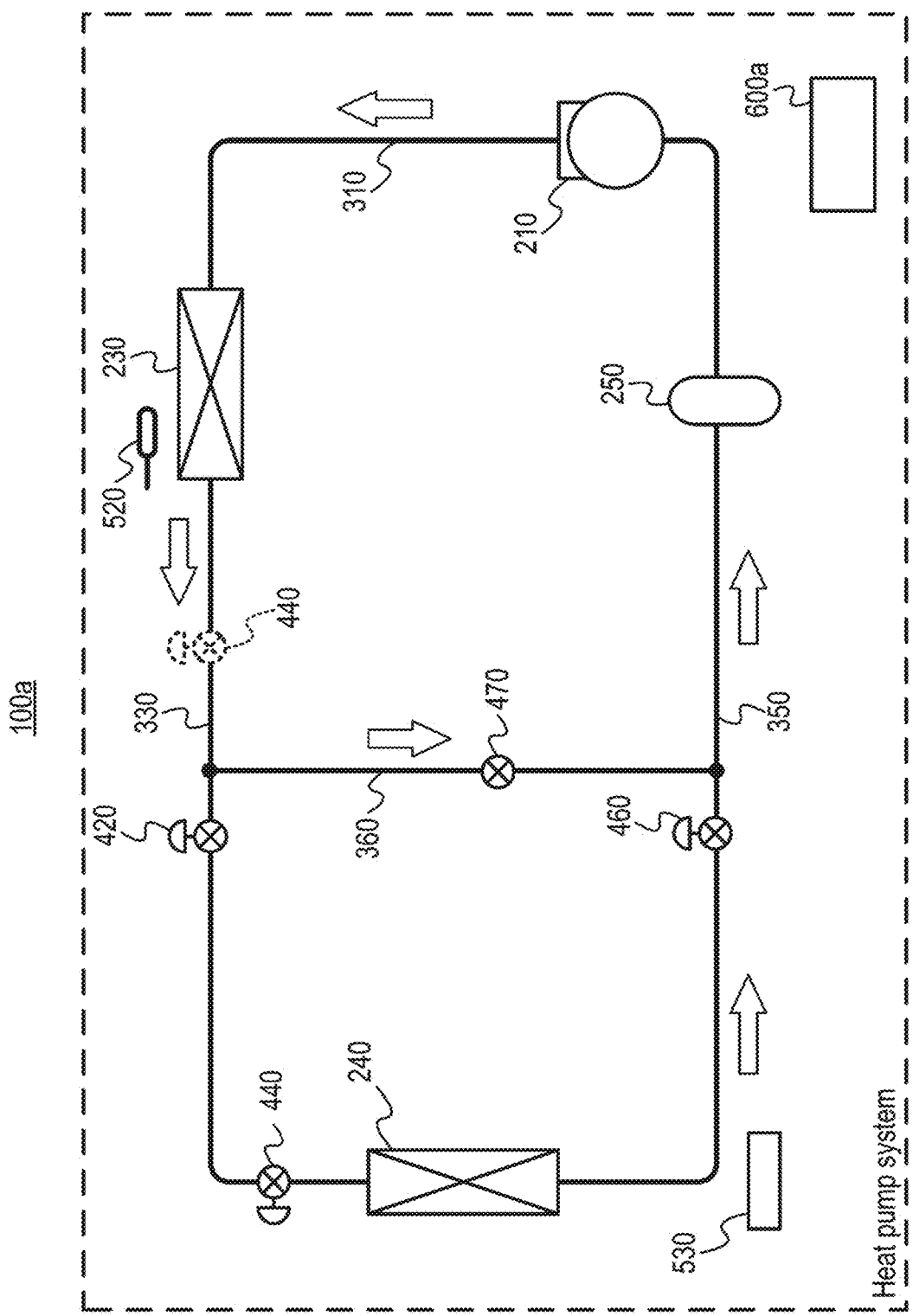
FIG. 6 is a schematic configuration view of a first modification of the heat pump system according to the preferred embodiment.

FIG. 6 is a schematic configuration view of a heat pump system as a first modification of the heat pump system 100 according to the present embodiment.

As shown in FIG. 6, the heat pump system 100a comprises the compressor 210, the heatsource-side heat exchanger 230, the utilization-side heat exchanger 240, the accumulator 250 disposed at a point between the bypass pipe 360 and the compressor 210, the discharge-side refrigerant pipe 310 connected to the heatsource-side heat exchanger 230, the liquid refrigerant pipe 330, the suction-side refrigerant pipe 350 connected to utilization-side heat exchanger 240, the bypass pipe 360, the utilization-side expansion mechanism 440, the gas-side on-off valve 460, the bypass expansion mechanism 470, the ambient temperature detector 520, and a controller 600a corresponding to the controller 600. The utilization-side expansion mechanism 440 may be disposed at a point between the heatsource-side heat exchanger 230 and the bypass pipe 360. In this configuration, the discharge-side refrigerant pipe 310 corresponds to the high-pressure refrigerant pipe according to the present invention, and the suction-side refrigerant pipe 350 corresponds to the low-pressure refrigerant pipe according to the present invention. Meanwhile, as mentioned above, the heat pump system 100a does not necessarily comprise the other elements explained in the present embodiment using FIG. 1. In addition, further elements can be omitted.

Figure 7:
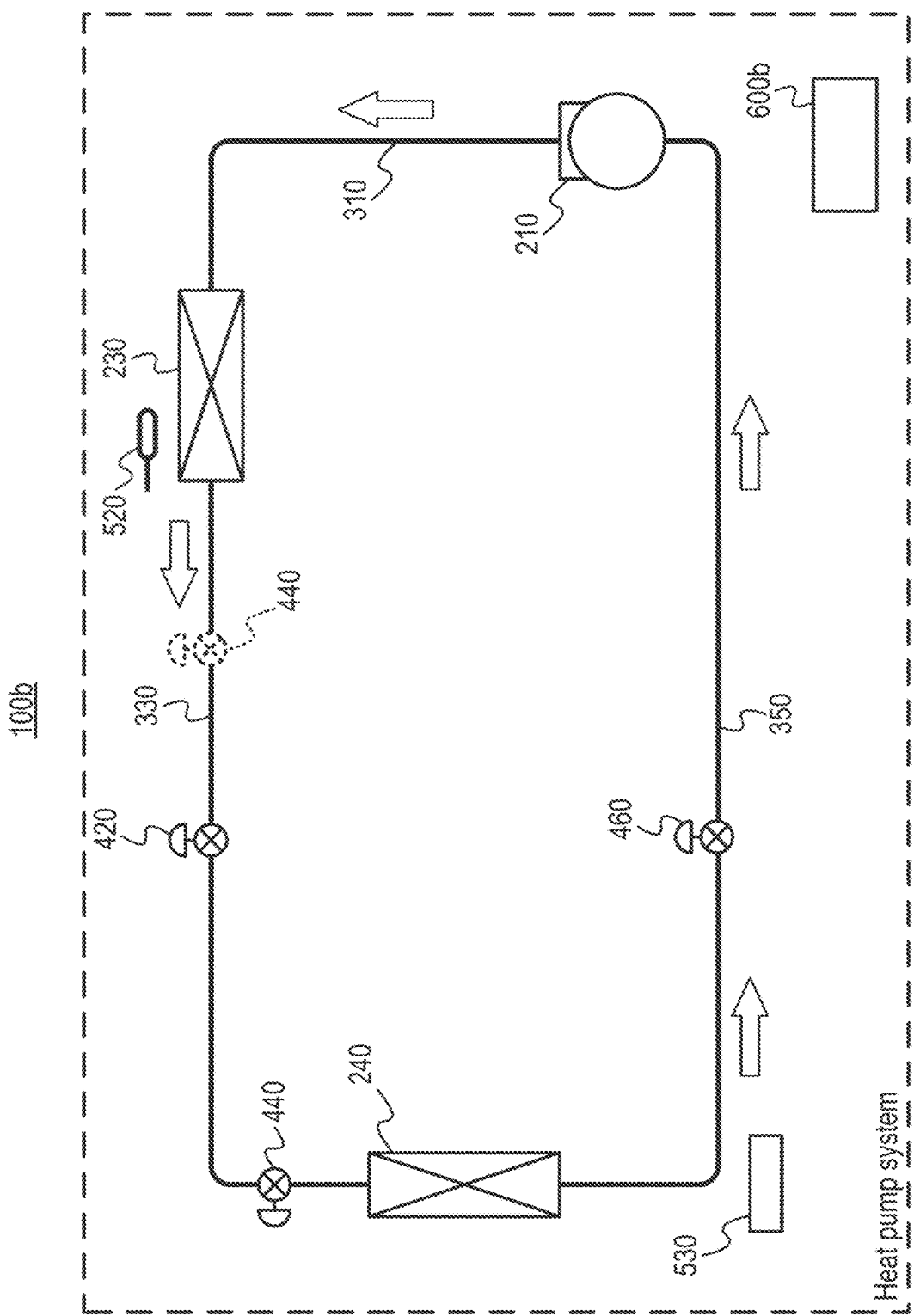
FIG. 7 is a schematic configuration view of a second modification of the heat pump system according to the preferred embodiment.

FIG. 7 is a schematic configuration view of a heat pump system as a second modification of the heat pump system 100 according to the present embodiment.

As shown in FIG. 7, the heat pump system 100b does not have the bypass pipe 360 and the bypass expansion mechanism 470, and the accumulator 250, compared with the first modification. Even if these elements are omitted, the refrigerant can be drawn from the utilization-side piping section 102 towards the heatsource-side piping section 101, and the drawn refrigerant can be accumulated mainly in the heatsource-side heat exchanger 230. The controller 600b of the heat pump system 100b, which corresponds to the controller 600, needs to perform less steps.

Other modifications of the present embodiment are also possible. For instance, the controller 600 may set three or more of different predetermined increase rate value Rv_1, Rv_2, Rv_3, . . . corresponding to different predetermined ambient temperature values Ta_th1, Ta_th2, . . . the ambient temperature detector 520 may acquire the temperature of the outdoor air from an external device such as a weather information server by wired/wireless communication. In this case, the ambient temperature detector 520 need not be arranged in the vicinity of the heatsource-side heat exchanger 230. If the discharge pressure is unlikely to be excessively high during the refrigerant recovery operation, the target increase rate value Rv_tgt need not be changed depending on the ambient temperature T1. In this case, the ambient temperature detector 520 can be omitted.

The refrigerant leakage detector 530 may be configured to detect an occurrence of refrigerant leakage in any part of the utilization-side piping section 102. The controller 600 may be disposed outside the heatsource-side piping section 101. The controller 600 may also be distanced away from the other part of the heat pump system 100. The fluid which passes thorough the heatsource-side heat exchanger 230 and the fluid which passes thorough the utilization-side heat exchanger 240 may be fluid other than air, such as water. Refrigerant other than R32 refrigerant may be used.

A plurality of the utilization-side units 120 may be connected to the heatsource-side unit 110. In this case, the liquid-side on-off valve 420 may be disposed for each of sub liquid refrigerant pipes branched from the liquid refrigerant 330 towards the utilization-side units 120, and the gas-side on-off valve 460 may be disposed for each of sub gas refrigerant pipes branched from the second gas refrigerant pipe 340 towards the utilization-side units 120. It is preferable that the liquid-side on-off valves 420 and the gas-side on-off valves 460 are disposed within or close to the heatsource-side unit 110. The refrigerant recovery operation is performed when an occurrence of refrigerant leakage has been detected in any of the utilization-side units 120 or any of the corresponding utilization-side piping sections 102. It is preferable that, among the liquid-side on-off valves 420 and the gas-side on-off valves 460, only the gas-side on-off valve 460 corresponding to the utilization-side unit 120 in which a refrigerant leakage has occurred is open during the refrigerant recovery operation.

While only selected embodiments and modifications have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Thus, the foregoing descriptions of the embodiments according to the present invention are provided for illustration only.

REFERENCE SIGNS LIST 100, 100a, 100b: Heat Pump System
101: Heatsource-Side Piping Section
102: Utilization-Side Piping Section
110: Heatsource-Side Unit
120: Utilization-Side Unit
210: Compressor
220: Mode Switching Mechanism
230: Heatsource-Side Heat Exchanger
231: Heatsource-Side Fan
240: Utilization-Side Heat Exchanger
241: Utilization-Side Fan
250: Accumulator
260: Refrigerant Heat Exchanger
310: Discharge-Side Refrigerant Pipe (High-Pressure Refrigerant Pipe)
320: First Gas Refrigerant Pipe (High-Pressure Refrigerant Pipe, Low-Pressure Refrigerant Pipe)
330: Liquid Refrigerant Pipe
340: Second Gas Refrigerant Pipe (Low-Pressure Refrigerant Pipe, High-Pressure Refrigerant Pipe)
350: Suction-Side Refrigerant Pipe (Low-Pressure Refrigerant Pipe)
360: Bypass Pipe
410: Heatsource-Side Expansion Mechanism (Expansion Mechanism)
420: Liquid-Side On-Off Valve
430: Liquid-Side Stop Valve
440: Utilization-Side Expansion Mechanism (Expansion Mechanism)
450: Gas-Side Stop Valve
460: Gas-Side On-Off Valve
470: Bypass Expansion Mechanism
510: Discharge-Side Refrigerant State Detector
520: Ambient Temperature Detector
530: Refrigerant Leakage Detector
540: Suction-Side Refrigerant State Detector (Evaporation Temperature Detector, Suction Pressure Detector)
600, 600a, 600b: Controller
610: Storage Section
620: Information Input Section
630: Normal Operation Controller
640: Information Output Section
650: Refrigerant Recovery Controller
651: Leakage Detection Section
652: Temperature Detection Section
653: Acceleration Rate Switching Section
654: Timing Control Section

The invention claimed is:

1. A heat pump system, comprising:
a compressor;
a heatsource-side heat exchanger configured to cause heat exchange between refrigerant flowing therein and fluid passing therethrough;
a utilization-side heat exchanger configured to cause heat exchange between refrigerant flowing therein and fluid passing therethrough;
a high-pressure refrigerant pipe connected to each of a discharge port of the compressor and the heatsource-side heat exchanger;
a liquid refrigerant pipe connected to each of the heatsource-side heat exchanger and the utilization-side heat exchanger;
a low-pressure refrigerant pipe connected to each of the utilization-side heat exchanger and a suction port of the compressor;
a liquid-side on-off valve disposed in the liquid refrigerant pipe;
an expansion valve disposed in the liquid refrigerant pipe;
a gas-side on-off valve disposed in the low-pressure refrigerant pipe; and
a controller configured to control the heat pump system to perform a refrigerant recovery operation for recovering refrigerant from a utilization-side piping section to a heatsource-side piping section by operating the compressor while the liquid-side on-off valve is closed and the gas-side on-off valve is open,
the utilization-side piping section extending between the liquid-side on-off valve and the gas-side on-off valve and including at least the utilization-side heat exchanger,
the heatsource-side piping section extending between the gas-side on-off valve and the liquid-side on-off valve and including at least the compressor,
wherein,
the controller is configured to, in the refrigerant recovery operation,
control the heat pump system such that the gas-side on-off valve starts closing when a predetermined valve-close condition is satisfied during the compressor is operating for recovering refrigerant, and such that the operation of the compressor for recovering refrigerant stops after the closing of the gas-side on-off valve started, and
control the compressor such that operation of the compressor stops when a predetermined compressor-stop condition is satisfied after the gas-side on-off valve has started closing, and wherein the predetermined compressor-stop condition includes at least one of:
a first condition that change rate of pressure of refrigerant flowing in the high-pressure refrigerant pipe is below a first predetermined change rate value and change rate of pressure of refrigerant flowing in the low-pressure refrigerant pipe is below a second predetermined change rate value which is equal to or different from the first predetermined change rate value; and
a second condition that pressure of refrigerant flowing in the low-pressure refrigerant pipe is below a second predetermined suction pressure value which is lower than the first predetermined suction pressure value.

2. The heat pump system according to claim 1, further comprising:
a refrigerant leakage detector configured to detect an occurrence of refrigerant leakage in the utilization-side piping section,
wherein
the controller is configured to control the heat pump system to perform the refrigerant recovery operation when the occurrence of refrigerant leakage has been detected.

3. The heat pump system according to claim 1, wherein the gas-side on-off valve is an electric valve.

4. The heat pump system according to claim 1, wherein:
at least the utilization-side heat exchanger is disposed in a utilization-side unit; and
at least the compressor, the gas-side on-off valve, and the controller are disposed in a heatsource-side unit which is separated from the utilization-side unit.

5. The heat pump system according to claim 1, wherein Cv value of the gas-side on-off valve is greater than Cv value of liquid-side on-off valve.

6. The heat pump system according to claim 1, further comprising:
a bypass pipe connected to the liquid refrigerant pipe at a point between the heatsource-side heat exchanger and the liquid-side on-off valve and connected to the low-pressure refrigerant pipe at a point between the gas-side on-off valve and the compressor;
a bypass expansion valve disposed in the bypass pipe; and
an accumulator interposed in the low-pressure refrigerant pipe at a point between the bypass pipe and the compressor,
wherein
the controller is configured to control, in the refrigerant recovery operation, the bypass expansion valve to open.

7. The heat pump system according to claim 1, wherein the controller is configured to, in the refrigerant recovery operation, control the heat pump system such that the operation of the compressor for recovering refrigerant stops after the closing of the gas-side on-off valve is completed.

8. The heat pump system according to claim 1, further comprising
a suction pressure detector configured to detect pressure of refrigerant flowing in the low-pressure pipe,
wherein
the predetermined valve-close condition includes that the pressure of refrigerant flowing in the low-pressure pipe is below a first predetermined suction pressure value.

9. The heat pump system according to claim 8, wherein the predetermined valve-close condition further includes that the pressure of refrigerant flowing in the low-pressure pipe has been kept below the first predetermined suction pressure value for a second predetermined time.

10. The heat pump system according to claim 1, wherein the predetermined compressor-stop condition further includes at least one of:
a third condition that a third predetermined time has elapsed after the closing of the gas-side on-off valve was completed; and
a fourth condition that a fourth predetermined time has elapsed after the closing of the gas-side on-off valve started.

11. A controller for controlling operation of a heat pump system,
the heat pump system comprising:
a compressor;
a heatsource-side heat exchanger configured to cause heat exchange between refrigerant flowing therein and fluid passing therethrough;
a utilization-side heat exchanger configured to cause heat exchange between refrigerant flowing therein and fluid passing therethrough;
a high-pressure refrigerant pipe connected to each of a discharge port of the compressor and the heatsource-side heat exchanger;
a liquid refrigerant pipe connected to each of the heatsource-side heat exchanger and the utilization-side heat exchanger;
a low-pressure refrigerant pipe connected to each of the utilization-side heat exchanger and a suction port of the compressor;
a liquid-side on-off valve disposed in the liquid refrigerant pipe;
an expansion disposed in the liquid refrigerant pipe; and
a gas-side on-off valve disposed in the low-pressure refrigerant pipe,
the controller being configured to control the heat pump system to perform, when the occurrence of refrigerant leakage has been detected, a refrigerant recovery operation for recovering refrigerant from a utilization-side piping section to a heatsource-side piping section by operating the compressor while the liquid-side on-off valve is closed and the gas-side on-off valve is open,
the utilization-side piping section extending between the liquid-side on-off valve and the gas-side on-off valve and including at least the utilization-side heat exchanger,
the heatsource-side piping section extending between the gas-side on-off valve and the liquid-side on-off valve and including at least the compressor,
wherein
the controller is configured to, in the refrigerant recovery operation,
control the heat pump system such that the gas-side on-off valve starts closing when a predetermined valve-close condition is satisfied during the compressor is operating for recovering refrigerant, and such that the operation of the compressor for recovering refrigerant stops after the closing of the gas-side on-off valve started, and
control the compressor such that operation of the compressor stops when a predetermined compressor-stop condition is satisfied after the gas-side on-off valve has started closing, and wherein
the predetermined compressor-stop condition includes at least one of:

a first condition that change rate of pressure of refrigerant flowing in the high-pressure refrigerant pipe is below a first predetermined change rate value and change rate of pressure of refrigerant flowing in the low-pressure refrigerant pipe is below a second predetermined change rate value which is equal to or different from the first predetermined change rate value; and a second condition that pressure of refrigerant flowing in the low-pressure refrigerant pipe is below a second predetermined suction pressure value which is lower than the first predetermined suction pressure value.

12. The heat pump system according to claim 2, wherein the gas-side on-off valve is an electric valve.

13. The heat pump system according to claim 2, wherein:
at least the utilization-side heat exchanger is disposed in a utilization-side unit; and
at least the compressor, the gas-side on-off valve, and the controller are disposed in a heatsource-side unit which is separated from the utilization-side unit.

14. The heat pump system according to claim 3, wherein:
at least the utilization-side heat exchanger is disposed in a utilization-side unit; and
at least the compressor, the gas-side on-off valve, and the controller are disposed in a heatsource-side unit which is separated from the utilization-side unit.

15. The heat pump system according to claim 2, wherein Cv value of the gas-side on-off valve is greater than Cv value of liquid-side on-off valve.

16. The heat pump system according to claim 3, wherein Cv value of the gas-side on-off valve is greater than Cv value of liquid-side on-off valve.

17. The heat pump system according to claim 4, wherein Cv value of the gas-side on-off valve is greater than Cv value of liquid-side on-off valve.

18. The heat pump system according to claim 2, further comprising:
a bypass pipe connected to the liquid refrigerant pipe at a point between the heatsource-side heat exchanger and the liquid-side on-off valve and connected to the low-pressure refrigerant pipe at a point between the gas-side on-off valve and the compressor;
a bypass expansion valve disposed in the bypass pipe; and
an accumulator interposed in the low-pressure refrigerant pipe at a point between the bypass pipe and the compressor,
wherein
the controller is configured to control, in the refrigerant recovery operation, the bypass expansion valve to open.

19. The heat pump system according to claim 3, further comprising:
a bypass pipe connected to the liquid refrigerant pipe at a point between the heatsource-side heat exchanger and the liquid-side on-off valve and connected to the low-pressure refrigerant pipe at a point between the gas-side on-off valve and the compressor;
a bypass expansion valve disposed in the bypass pipe; and
an accumulator interposed in the low-pressure refrigerant pipe at a point between the bypass pipe and the compressor,
wherein
the controller is configured to control, in the refrigerant recovery operation, the bypass expansion valve to open.

20. The heat pump system according to claim 4, further comprising:
a bypass pipe connected to the liquid refrigerant pipe at a point between the heatsource-side heat exchanger and the liquid-side on-off valve and connected to the low-pressure refrigerant pipe at a point between the gas-side on-off valve and the compressor;
a bypass expansion valve disposed in the bypass pipe; and
an accumulator interposed in the low-pressure refrigerant pipe at a point between the bypass pipe and the compressor,
wherein
the controller is configured to control, in the refrigerant recovery operation, the bypass expansion valve to open.

* * * * *